United States Patent
Lizaso

(10) Patent No.: US 8,471,676 B1
(45) Date of Patent: Jun. 25, 2013

(54) SECURITY DOOR CONTROL SYSTEM

(75) Inventor: Juan Lizaso, Hialeah, FL (US)

(73) Assignee: Dash Door & Closer Service, Inc., Miami, FL (US)

( * ) Notice: Subject to any disclaimer, the term of this patent is extended or adjusted under 35 U.S.C. 154(b) by 557 days.

(21) Appl. No.: 12/698,502

(22) Filed: Feb. 2, 2010

(51) Int. Cl.
*G08B 29/00* (2006.01)

(52) U.S. Cl.
USPC .............. 340/5.2; 340/506; 340/500

(58) Field of Classification Search
USPC ............... 340/5.1, 5.2, 5.21, 5.22, 5.23, 5.31, 340/5.32, 5.7, 5.71, 686.1, 3.1; 455/556.1, 455/41.2
See application file for complete search history.

(56) References Cited

U.S. PATENT DOCUMENTS

| | | | | |
|---|---|---|---|---|
| 4,816,658 | A | * | 3/1989 | Khandwala et al. .......... 235/382 |
| 2010/0085145 | A1 | * | 4/2010 | Laird .............................. 340/5.7 |

* cited by examiner

*Primary Examiner* — Nabil Syed
(74) *Attorney, Agent, or Firm* — Malin Haley DiMaggio & Bowen, P.A.

(57) ABSTRACT

A security door control system for managing the sequence of operation for security doors by controlling access between non-secure and secure areas. The system comprises a software logic installed on programmable logic controllers that operates the system by processing inputs from a plurality of local and remote sources and providing in real time individualized control signals to a plurality of fully automated security doors and multiple local and remote associated security door components.

1 Claim, 3 Drawing Sheets

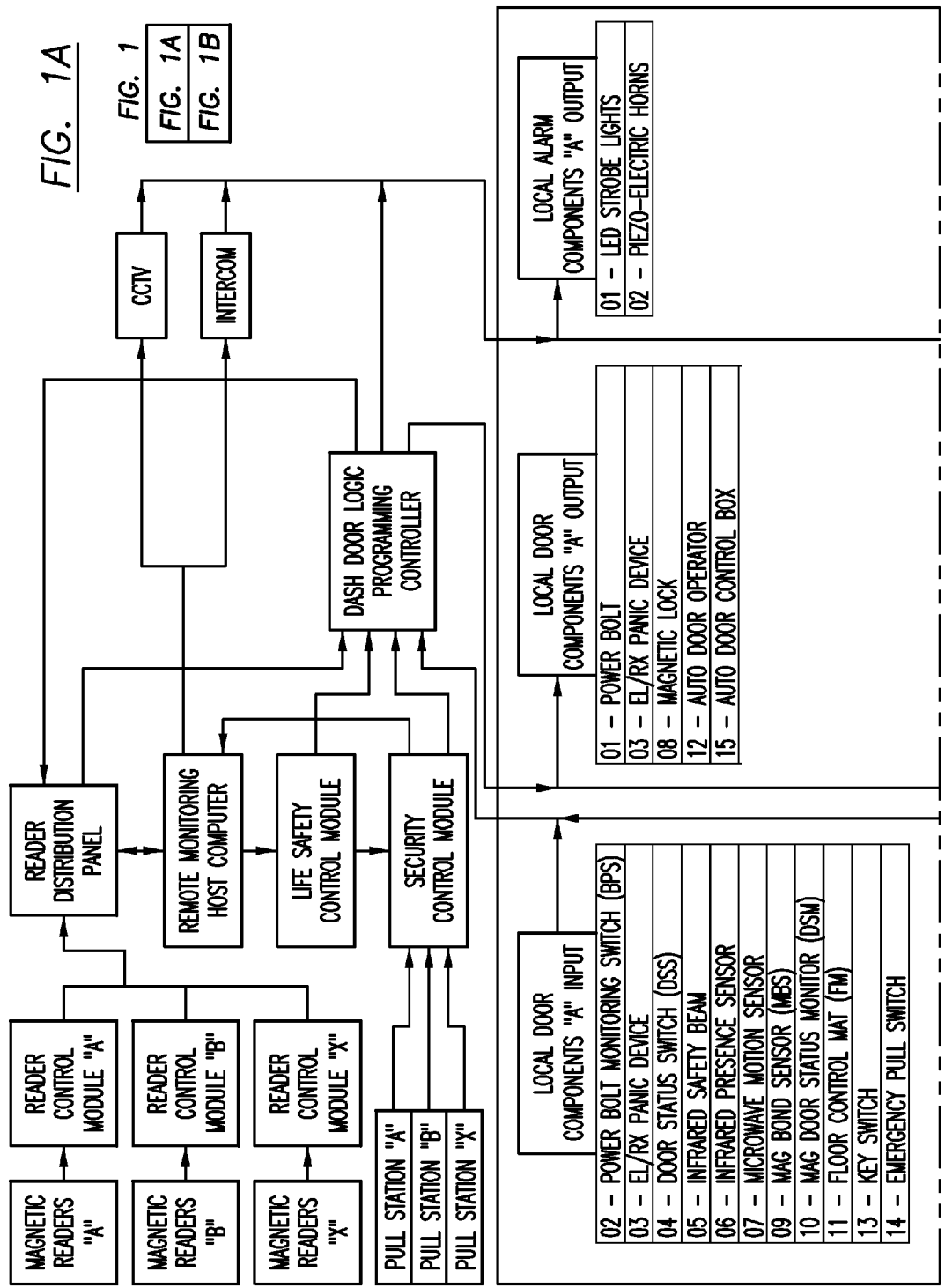

SECURITY DOOR CONTROL SYSTEM

BACKGROUND OF THE INVENTION

1. Field of the Invention

The present invention relates to generally to a system that manages the sequence of operation for security portals by controlling access between non-secure and secure areas, and more specifically to a software logic that operates a security door control system by processing local condition information from a plurality of inputs and regulating the operation of a plurality of fully automated security components in real time.

2. Description of Related Art

Security systems of all kinds have become ubiquitous in today's society. The expansiveness and complexity of such systems vary greatly and usually correspond in some way to the level of security required for a particular application. For example, security systems for many residences are usually manually activated and utilize relatively few components, while a security system at a bank typically consists of many more components, some of which may be automated components. Furthermore, a security system in an airport, particularly at concourse checkpoints, requires an even more expansive and complex system of interrelated and interdependent manual and automatic components. This is because the concourse checkpoint areas serve to prevent breach or other unauthorized passage from non-secure areas at public openings to the secure terminals. The airlines, airport and airline employees, businesses, passengers, or anyone that could potentially be in range of a would-be runaway plane, all rely on such a system to provide the upmost security to the secure terminal areas, and provide it in an efficient manner.

Concourse checkpoints at many domestic airports consist of a plurality of interconnected areas, with a security system in place that uses security portals at the connection points between these areas that allow or restrict access between the areas based on some preset protocol. However, if the security system is breached at one of the security portals, automated response usually involves locking down the most if not all of the areas. Consequently, what is needed is a security system that can automatically isolate the specific location of the breach and immediately lock down only the areas necessary to contain the areas that are adjoining to the location of the breach.

In addition, many airports are now designed to have more flexible use of terminals and terminal gates. To explain, many domestic airports were historically designed to have a dedicated terminal or terminal gates to handle international traffic, which requires an additional security setup to direct passengers through U.S. Customs. However, many airports now are designed or have renovated in a way where international traffic can be handled through many different terminals or terminal gates. Therefore, there is a need for a security system that can be adjusted to allow passengers direct access to the main terminal or restrict access to particular areas so that the passengers are directed to Customs.

SUMMARY OF THE INVENTION

The invention described herein is embodied in a security door control system that manages the sequence of operation for security portals (or security doors) controlling access between non-secure and secure areas. A smart access software developed by applicant and installed on programmable logic controllers operates the system by processing inputs from a plurality of local and remote sources and providing in real time individualized control signals to a plurality of fully automated security portals and multiple local and remote associated security portals components.

A security door control system having a programmable logic controller and connected to a plurality of security portals with the ability to: a) monitor for and read outputs from plurality of local components, wherein said local components are comprised of an Emergency Touch Bar (door panic device), a Power Lock Monitoring Switch (BPS), a Door Status Position Switch (DSS), a Wall Key Switch, an Emergency Wall Pull Switch, Floor Control Mats, Infrared Safety Beams, Infrared Presence Sensors, and Microwave motion detectors; (b) monitor for and read outputs from plurality of remote components, wherein said remote components include a Fire Control Command Module (FCM) Fire Alarm System, an Emergency Control Command Module (ECM) Life Safety System, an Access Control Module (RCM) Card Reader Access Control System, and a Remote Monitoring (OCR) Operation Control Room; (c) process one or more inputs simultaneously and determine the desired action outputs; (d) transmit local action outputs to one or more targeted core system components such as automated doors, wherein said local action outputs are sent to Electromagnetic Locking Devices, Electromechanical Locking Devices, LED Multi-Color Strobe Lights, Piezo-Electric Horns, an Automatic Door Operator, and an Automatic Door Control Box; and (e) transmit remote action outputs to one or more targeted auxiliary components, wherein said remote action outputs are sent to an Alarm Interface Card Reader Access Control System, Remote Control Board LED Indicating Lights, a Remote Intercom Activation Monitor, and a Closed Circuit Television Control Monitor.

The security door system continuously reads the above listed real time inputs and uses the data to decide and implement the proper operation mode. The system operates in either a Normal Mode, which allows for typical system operation, or a Security Yellow Mode, which facilitates the identification and containment of any undesired activity. In each mode, the system provides a specific, targeted set of outputs in real time to affected components. In addition, the system supervises and is distinctly responsive to the status of electrical power to the system and the status of a fire alarm.

The above functions are accomplished using a host computer facilitating a hard wired network with a centralized static IP routable server. Wireless capability that facilitates RFID input can be added to supplement operation in both Normal and Security Yellow Modes.

It is the object of this invention provide to an elevated security intensity that meets public life safety standards by integrating a plurality of security doors with local components such as audible alarms, strobe lights, electromagnetic locks and remote components such as card reader access control controllers, life safety control panels, and remote monitoring.

In accordance with these and other objects which will become apparent hereinafter, the instant invention will now be described with particular reference to the accompanying drawings.

BRIEF DESCRIPTION OF THE DRAWINGS

FIG. 1A and FIG. 1B are flow charts showing the components and data connections of the present invention.

PREFERRED EMBODIMENT OF THE INVENTION

Figure 1B:
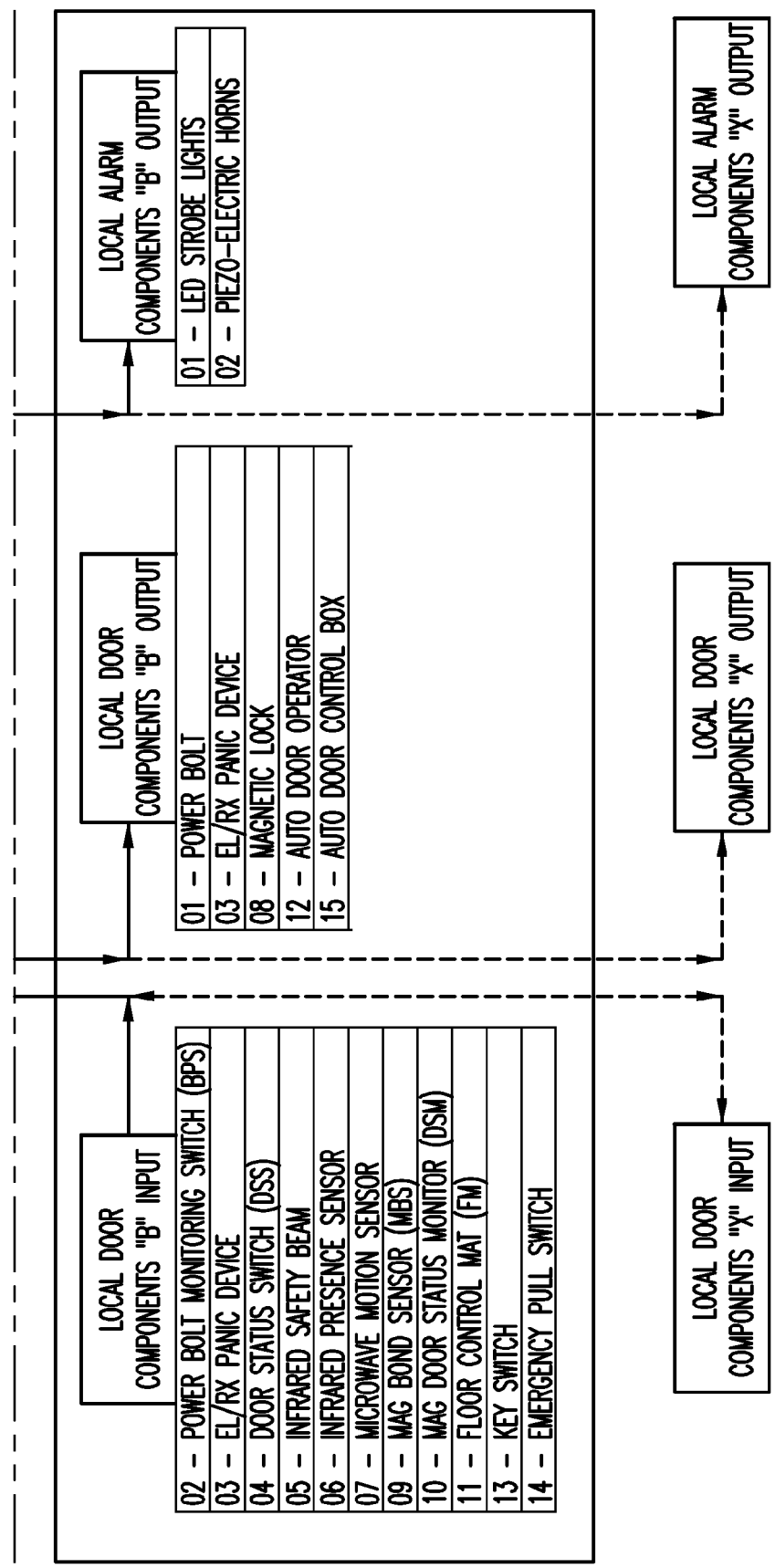

A security door control system for managing the sequence of operation for a plurality of security doors by controlling access between non-secure and secure areas, in accordance with the present invention, is described with initial reference to FIG. 1. The heart of the system is a control system logic programming controller ("control system PLC"), which is the decision engine of the system. The control PLC controls access between non-secure and secure areas by automatically providing controls to a plurality of containment doors and an alarm system. The control system PLC primarily operates the system in a normal mode or a security mode where all decision are made under a custom logic specific to the situation, however the control system PLC can also make specific individualized decisions in response to specific stimuli. The control system PLC compiles data from a plurality of containment door functional components, a reader distribution panel, a life safety control module, and a security control module and provides individualized instructions to various components on each containment door. This data pertains to the real time environment around each containment door and allows the control system PLC to provide various commands to various system components based preset conditions.

Each containment door comprises a removable closure capable of covering a wall aperture or passageway, as well as the peripheral structure in the passageway around the closure. The functional components for each containment door include a magnetic locking device, a mechanical power bolt device, an electronic panic device, a safety beam device, a presence sensor device, a motion sensor device, a floor control mat device, a key switch device, and an emergency pull station. In addition, at least one magnetic card reader is present at the periphery of each containment door. However, magnetic card readers are also positioned outside and inside any door within the secure area where access is restricted, such as doors to offices and utility rooms.

The magnetic locking device comprises an electromagnetic locking mechanism, a magnetic bond sensor, and a magnetic door status monitor. The electromagnetic locking mechanism operates using a magnetic core within the removable closure portion of the containment door and a door armature plate that is embedded on the immediate periphery of the removable closure. The electromagnetic locking mechanism has a default setting of off when the system is operating in normal mode, where it is disengaged and receives no electrical power. The electromagnetic locking mechanism goes into security mode when it receives a security mode signal, causing it to receive power and electromagnetically engage. The electromagnetic locking mechanism remains engaged until the signal changes to normal mode, when it then returns to the default setting. The magnetic bond sensor reads magnetic holding force between the magnetic core and the door armature plate, providing an on input to the control system PLC when the magnetic holding force is greater than 85% of designed attach force and an off input at any other time. The magnetic door status monitor supplies an open input to the control system PLC if the removable closure is disengaged at any place from the periphery of the removable closure and a closed input at any other time.

The mechanical power bolt device comprises a power bolt mechanism and a power bolt monitoring switch. The power bolt mechanism is an electromechanical device that utilizes a conventional bolt locking system. The power bolt mechanism, when operating in normal mode, has a default setting of off, where it is disengaged and receives no power. In response receiving a security mode signal from the control system PLC, the power bolt mechanism receives power and engages power bolt lock and remains engaged until the signal changes to normal mode, when it then returns to the default setting. The power bolt monitoring switch provides the control system PLC with the on/off status of door power bolt.

The electronic panic device is a manual override that comprises a request exit switch and panic device sensor. The request exit switch is a switch that can be depressed by traffic approaching a containment door and when depressed, allows the power bolt mechanism to receive electric power and disengage the mechanical lock so door can be freely opened. The default setting is off, where it is disengaged and ready to receive electric power to disengage mechanical device. The on setting transmitted to the control system PLC allows the release of the lock so door can be freely opened. The panic device sensor supplies the on/off status of panic device mechanism to the control system PLC.

The safety beam device comprises a stand alone infrared sensor that beams across the removable closure's threshold area. The safety beam device supplies an on status to the control system PLC of the removable closure's threshold area when the beam is blocked and an off status to the control system PLC of electronic the removable closure's threshold area at all other times.

The presence sensor device comprises an infrared presence sensor that determines the presence of anything in the removable closure's swing side area. The presence sensor supplies an on status to the control system PLC when anything is detected in the swing side area and an off status to the control system PLC at all other times.

The motion sensor device comprises a stand alone microwave sensor which detects movement of traffic in the area approaching the removable closure. The motion sensor device supplies an on status to the control system PLC when any movement of traffic in the area approaching the removable closure is detected and an off status to the control system PLC at all other times.

The floor control mat device comprises a floor mat with a built in floor mat sensor that flags any weight bigger than 25 lbs per square inch on any point of floor mat. The floor control mat device provides an on status to the control system PLC anytime weight bigger than 25 lbs per square inch on any point of floor mat is sensed and an off status to the control system PLC at all other times.

The key switch device comprises a wall switch which is operated by key cylinder mechanism. The key switch device is a manual override that allows a user with a key corresponding to the key cylinder mechanism to request and receive access through a containment door that is closed or locked.

Emergency pull stations are located at each checkpoint, including each containment door. Each emergency pull station is a manual switch allowing a user at any checkpoint to actuate an alarm local to that checkpoint, simply but manually engaging the pull station. The pull station's default position is off, which indicates that it has not been manually engaged. Once it ahs been manually engaged, the engaged pull station is in the on position. Each emergency pull station constantly transmits a signal that identifies the pull station and indicates whether the pull station is in the default off position or a manually induced on position to a Security Control Module, the operation of which is discussed below.

Each door also is equipped with a door status switch, an automatic door device. The door status switch uses corresponding sensors on the removable closure and the periphery to provides an open/closed input to the control system PLC, which is an indication of whether a door is fully closed or not. The automatic door device comprises an auto door operator and an auto door control box. The auto door operator operates in a default on status when operating in normal mode, where it operates to allow the door to close and open automatically, as designated by the user. However, the auto door operator switches to an off status when the control system PLC transmits the security mode signal, in which the auto door operator is disabled and only manual operation of the door is allowed. The auto door operator requires a normal mode signal from the control system PLC to switch back to on status. The auto door control box comprises an electronic master controller which monitors and can control the automatic door operators for all containment doors. The default setting is off, which allows the doors be operated automatically based on user settings or locally at each containment door. When the on setting is enabled, the auto door control box has complete and supreme control of the operation of each containment door.

In addition to the functional components of the containment doors, the control system PLC receives input from the security control module, a life safety control module, and a reader distribution panel. The security control module, life safety control module, and reader distribution panel each also provide input to a host computer. The host computer is a supplemental computer system that used to store verification information that is needed by a card processing system. The host computer is also controls the internal audio system and internal video system of the security door control system. The audio system comprises an intercom system that allows remote communication between the room where the host computer is located and the area surrounding any containment door. Similarly, video system comprises a closed circuit television system ("CCTV") which utilizes cameras positioned in the area surrounding every containment door to allow the area surrounding any containment door to be viewed from host computer room.

The security control module receives a constant stream of status data from every pull stations. As long as each pull station remains in the default off position, the security control module is inactive as it relates to the system. When a pull station begins indicating that it has entered into the on position, the security control module transmits a signal identifying the specific pull station in the on position to the control system PLC and to the host computer. In response, the control system PLC operates to isolate the area surrounding the specified containment door and the host computer begins displaying and recording that containment door's related CCTV feed.

The life safety control module receives content from life safety systems, such a fire alarm control module. The fire alarm control module monitors the status of all fire alarms on location and, in the event that a fire alarm is actuated, notifies the control system PLC and the host computer of the specific fire alarm. In response, the host computer begins displaying and recording the CCTV feeds closest to the location of the alarm.

The reader distribution panel is a component of the card processing system, which also comprises the magnetic card readers and a reader control module for each magnetic card reader. The magnetic card readers are typically situated at the containment doors where access requests are made and granted. In response to a compatible card being inserted in a particular reader, the reader reads the magnetic strip of a card transmits the content of the magnetic strip read to a corresponding reader control module. The reader control module receives this content from its corresponding magnetic reader and passes the data to its corresponding reader distribution panel in order to make a request to the host computer to verify the data on the inserted magnetic card. Each reader distribution panel is able to manage and facilitate communications with the host computer for up to four (4) reader control modules. Once magnetic card data is received, the host computer confirms whether the content of the magnetic strip read is valid and forwards a valid or invalid signal to the reader distribution panel. The reader distribution panel then provides the reader control module with a valid or invalid signal and if the data was valid, signals the control system PLC to permit access to the containment door from which the magnetic card access request was made.

At each containment door, the alarm system provides for visual and audio notification of an elevated security condition. The alarm system comprises LED strobe lights and Piezo-electric horns. The alarm system can be activated and deactivated from the control system PLC and the host computer. The control system PLC activates the alarm automatically if it detects a breach of a containment door, while the host computer provides for the manual activation or deactivation of the alarm for the scenario where a user views an otherwise undetected breach on the CCTV control monitor.

When the system is operating in normal mode, which indicates no active system wide or local alarm condition, containment doors are either held open continuously by a hold open magnet or locked closed by the magnetic power bolt. In addition, the control system PLC sends a door normal status signal to every reader control module. The decision of which containment doors are to be held open and which containment doors are to be held shut is based on the particular application in effect, such as a terminal containment application or a customs redirect application.

When an unauthorized passage through a checkpoint occurs, the security mode is activated by a checkpoint supervisor manually engaging the emergency pull station located at that checkpoint. Upon receiving a security mode signal from a pull station, the control system PLC immediately creates a perimeter containment area around the relevant pull station by releasing the hold open magnet of any containment door causing the electromagnetic bolt/lock to be energized to secure the containment door and any other containment door needed to establish the perimeter containment area. In addition, the control system PLC activates the yellow flashing lights at all security doors within the containment area. The host computer shall activate the CCTV and intercom system in response to the transmission either from the security control module that a pull station has been engaged or from the life safety control monitor that a fire alarm has been activated to allow for monitoring and recording until alarm is acknowledged by the operator of the host computer.

Once the alarm condition is acknowledged and perimeter containment area is cleared, authorized security personnel shall reset the emergency pull station that was activated. The control system PLC then interrupts power to the electromagnetic bolt/lock securing the door, send signal indicating normal status to respective reader control module, automatically open the door and energize the hold open magnet.

Figure 2:
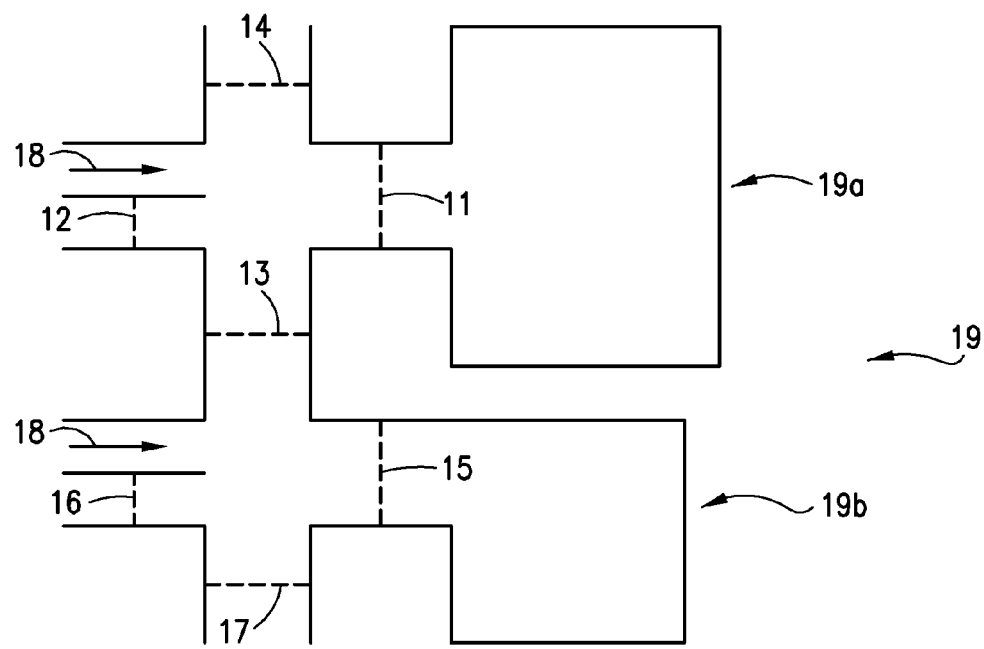
FIG. 2 is a plan view of the present invention deployed in an area containment environment.

Referring now to FIG. 2, in the terminal containment application, traffic 18 enter the terminal seeking to go to either a first concourse 19*a* or a second concourse 19*b*. In the event of an alarm condition being entered at either door 11, door 12, door 13, or door 14, control system PLC would create a containment perimeter area by automatically closing door 11, door 12, door 13, and door 14. However, door 15 and door 16 would be unaffected. This significantly allows the system to automatically select the needed containment doors to allows other secure areas to operate freely during an alarm condition.

Figure 3:
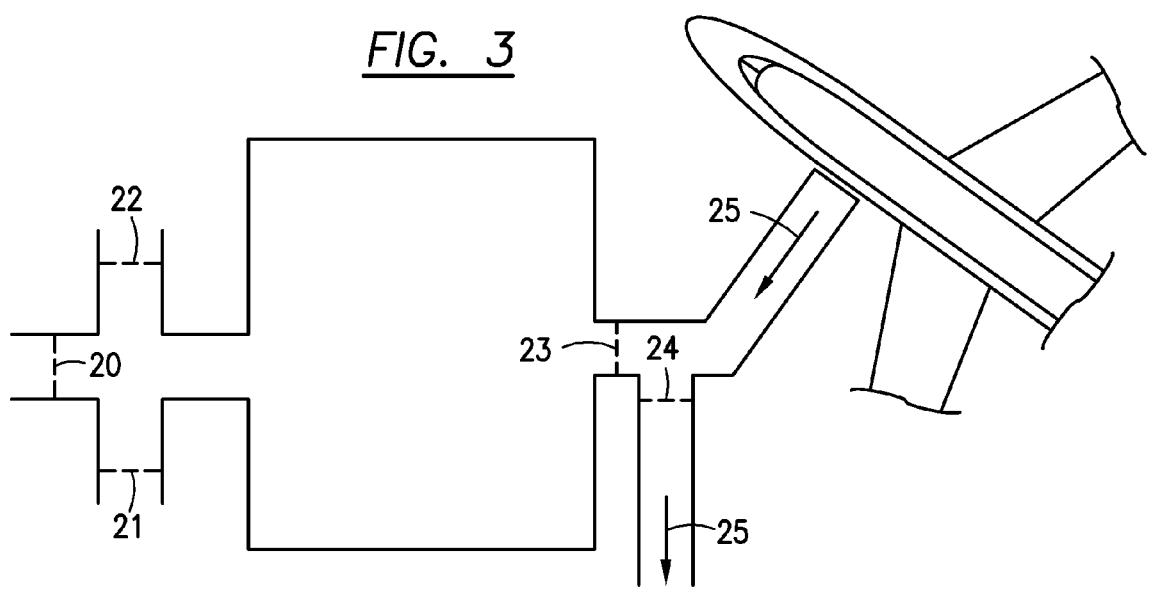
FIG. 3 is a plan view of the present invention deployed in a redirect traffic flow environment.

Referring now to FIG. 3, in the customs redirect application, traffic 25 is being directed through door 24 towards U.S. Customs. In the event of an alarm condition being entered at door 23, control system PLC would create a containment perimeter area by automatically closing door 20, door 22, and door 21. This would allow any breach that caused the alarm condition to be isolated in the affected terminal.

To attempt to access an area that has been isolated during a security mode, a user must insert a magnetic card that has been coded to grant the uses access to restricted areas. If such a card is insert into a magnetic reader, the reader control module for the magnetic reader shall signal the reader distribution panel to cause the control system PLC to interrupt power to the electromagnetic lock for an adjustable (1-255 Seconds) interval and allow passage through the containment door ("strike time"). The adjustable interval value shall be a preset but adjustable value as programmed by the administrator of the system. If the door is not opened during the strike time, the door shall re-lock. During "strike time", the door shall be pushed to open and the containment door will close automatically. When the door closes, the electromagnetic lock shall be re-energized and secure the door.

For operations occurring during strike time, the control system PLC also monitors the door status input and if door is left open longer than the preset interval ("ajar time") the control system PLC to activate the local alarm system. Under such a circumstance, the host computer will activate the CCTV and the intercom system to permit monitoring from the host computer room and automatic recording. Thus, computer operator shall have the capability of viewing the particular containment door location and communicating via two-way intercom communications. After a preset duration of time under an alarm condition, if the containment door remains open, the local alarm components shall automatically reset but the alarm status at the host computer shall remain active until reset by a valid card swipe. The only way to completely reset and clear an alarm condition at any time is by swiping a valid badge.

All card reader activity shall be acknowledged and stored in the host computer.

In the event of a fire alarm, the control system PLC is signaled through the life safety control module. The control system PLC then releases the hold open magnets containment doors to create a fire or smoke barrier conditions where required. The control system PLC distinguishes signals from the life safety control module and the pull stations. Consequently, when receiving signal from life safety control module only, the control system PLC shall release the hold open magnets to close the door when required and report normal door status to the RCM while maintaining the de-energized condition of the electromagnetic bolt/lock.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A security door control system used for managing the sequence of operation for security doors by controlling access between non-secure and secure areas comprising:

a programmable logic controller connected to a power supply;

a plurality of wall apertures in one or more walls or partitions, wherein each wall aperture has a corresponding removable closure sized to cover its corresponding wall aperture and includes a corresponding emergency pull station;

said removable closures being connected to said programmable logic controller sufficient to receive electronic commands from said programmable logic controller, wherein each removable closure includes a user interface, a locking mechanism and a motorized operator;

said motorized operator being capable of positioning said removable closure over the wall aperture and removing said removable closure from said wall aperture in response to electronic commands from said programmable logic controller;

an access control system connected to said programmable logic controller and said user interface, wherein said access control system informs said programmable logic controller of data entered into each said user interface;

a security control module connected to said emergency pull stations and programmable logic controller, wherein said security control module informs said programmable logic controller of the present status of at least one of said emergency pull stations;

wherein said programmable logic controller issues commands to each removable closure independently; and wherein said programmable logic controller processes access input from at least each said access control system and decides whether to operate one or more removable closure that is not positioned over its corresponding wall aperture to seal over the wall aperture or one or more removable closure that is positioned over its corresponding wall aperture to removing said removable closure from the wall aperture based on said access input; and wherein said programmable logic controller additionally processes data from said security control module sufficient allow said programmable logic controller to automatically operate removable closures to isolate any area surrounding a particular wall aperture in response to the emergency pull station corresponding to said wall aperture in the on position;

one or more fire alarm devices in predetermined, fixed locations;

a life safety module connected to said fire alarm devices and said programmable logic controller, wherein said security control module informs said programmable logic controller of the present status of at least one of said fire alarm devices; and wherein said programmable logic controller additionally processes data from said life safety module sufficient allow said programmable logic controller to automatically operate removable closures to create a fire or smoke barrier surrounding a particular fire alarm device in response a fire alarm being actuated at the particular fire alarm device.

wherein the programmable logic controller causes any removable closure sealed over its corresponding wall aperture in creating a fire or smoke barrier to remain unlocked.

* * * * *